United States Patent
Strege et al.

(10) Patent No.: US 11,872,965 B2
(45) Date of Patent: Jan. 16, 2024

(54) SYSTEM AND METHOD FOR GYROSCOPIC PLACEMENT OF VEHICLE ADAS TARGETS

(71) Applicant: Hunter Engineering Company, Bridgeton, MO (US)

(72) Inventors: Timothy A. Strege, Sunset Hills, MO (US); Nicholas J. Colarelli, III, Frontenac, MO (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 456 days.

(21) Appl. No.: 17/313,699

(22) Filed: May 6, 2021

(65) Prior Publication Data

US 2021/0347338 A1  Nov. 11, 2021

Related U.S. Application Data

(60) Provisional application No. 63/022,878, filed on May 11, 2020.

(51) Int. Cl.
  *B60S 5/00* (2006.01)
  *G01P 13/00* (2006.01)
  *G07C 5/08* (2006.01)

(52) U.S. Cl.
  CPC ............. *B60S 5/00* (2013.01); *G01P 13/00* (2013.01); *G07C 5/0808* (2013.01)

(58) Field of Classification Search
  CPC ........... B60S 5/00; G01P 13/00; G07C 5/0808
  See application file for complete search history.

(56) References Cited

U.S. PATENT DOCUMENTS

| | | | |
|---|---|---|---|
| 6,329,952 B1 * | 12/2001 | Grace | H01Q 21/061 342/174 |
| 7,177,740 B1 * | 2/2007 | Guangjun | G01M 17/027 73/146 |
| 7,382,913 B2 * | 6/2008 | Dorranc | G06T 7/70 382/151 |
| 7,424,387 B1 * | 9/2008 | Gill | G01B 11/272 33/288 |
| 8,244,024 B2 * | 8/2012 | Dorrance | G01B 11/2755 382/151 |
| 9,087,420 B2 * | 7/2015 | Amirpour | G07C 5/008 |
| 9,491,451 B2 * | 11/2016 | Pliefke | H04N 17/002 |
| 9,520,006 B1 * | 12/2016 | Sankovsky | G07C 5/02 |
| 9,719,801 B1 * | 8/2017 | Ferguson | G01C 21/005 |

(Continued)

OTHER PUBLICATIONS

"Gyroscopic Sensors", Oct. 27, 2010, 15 pages, ip.com publication IPCOM000200877D.

*Primary Examiner* — Luis A Martinez Borrero
(74) *Attorney, Agent, or Firm* — Sandberg Phoenix & von Gontard PC

(57) ABSTRACT

A vehicle ADAS target or fixture is configured with an Inertial Measurement Unit (IMU) consisting of a combination of accelerometers and gyroscopes capable of estimating a relative position and orientation within the spatial volume of the vehicle service area by tracking changes in acceleration and rotation. A controller monitors movement of the IMU relative to an established reference location, generating output utilized by a vehicle service system to guide a technician to position and orient the vehicle ADAS target or fixture at a selected location within the vehicle service area required to conduct a vehicle ADAS service procedure.

20 Claims, 4 Drawing Sheets

(56) References Cited

U.S. PATENT DOCUMENTS

| | | | | |
|---|---|---|---|---|
| 10,458,811 B2* | 10/2019 | Voeller | G01S 13/931 |
| 10,553,044 B2* | 2/2020 | Mercep | G06F 18/251 |
| 10,634,488 B2* | 4/2020 | Stieff | G01S 7/4972 |
| 10,996,053 B2* | 5/2021 | Stieff | G01S 7/4972 |
| 10,996,314 B2* | 5/2021 | Stieff | G01B 11/026 |
| 11,145,084 B2* | 10/2021 | Cejka | G06T 7/248 |
| 11,243,074 B2* | 2/2022 | DeBoer | G01B 11/275 |
| 11,279,327 B1* | 3/2022 | Jackson, Jr. | G01S 7/4972 |
| 11,313,946 B2* | 4/2022 | Cejka | G01S 7/40 |
| 11,327,155 B2* | 5/2022 | Nemati | G01S 13/86 |
| 11,385,134 B1* | 7/2022 | Stieff | H04N 9/315 |
| 11,390,289 B2* | 7/2022 | Corghi | G01S 7/40 |
| 11,414,092 B2* | 8/2022 | Patnala | B60W 50/032 |
| 11,465,632 B2* | 10/2022 | Corghi | G01B 11/2755 |
| 11,474,193 B2* | 10/2022 | Huffman | G01S 5/16 |
| 11,493,597 B2* | 11/2022 | Bruns | G01S 15/931 |
| 11,538,188 B1* | 12/2022 | Cejka | G06T 7/80 |
| 11,597,091 B2* | 3/2023 | Lawrence | G01S 7/4972 |
| 11,610,335 B2* | 3/2023 | Cejka | G06T 7/74 |
| 11,624,608 B2* | 4/2023 | Lawrence | G01S 7/4086 701/33.1 |
| 11,676,304 B2* | 6/2023 | Corghi | G01S 13/931 73/1.79 |
| 11,704,830 B2* | 7/2023 | Cejka | G03B 43/00 348/142 |
| 11,721,140 B2* | 8/2023 | Brauer | G07C 5/008 701/31.4 |
| 11,763,486 B2* | 9/2023 | Cejka | H04N 23/56 348/142 |
| 2005/0096807 A1* | 5/2005 | Murray | G01B 11/2755 33/288 |
| 2013/0100290 A1* | 4/2013 | Sato | G06T 7/80 348/148 |
| 2015/0073642 A1* | 3/2015 | Widmer | G01C 21/3635 701/22 |
| 2015/0317780 A1* | 11/2015 | Dumont | G01C 11/30 348/47 |
| 2016/0223643 A1* | 8/2016 | Li | G01S 7/0236 |
| 2016/0239013 A1* | 8/2016 | Troy | B25J 9/1664 |
| 2016/0291160 A1* | 10/2016 | Zweigle | G01S 7/4813 |
| 2017/0052032 A1* | 2/2017 | Miksa | G01C 21/30 |
| 2017/0076455 A1* | 3/2017 | Newman | G06T 7/74 |
| 2017/0124781 A1* | 5/2017 | Douillard | G08G 1/207 |
| 2018/0003512 A1* | 1/2018 | Lynch | G01C 21/3811 |
| 2018/0032082 A1* | 2/2018 | Shalev-Shwartz | G06N 3/044 |
| 2018/0172454 A1* | 6/2018 | Ghadiok | G06T 7/74 |
| 2018/0202815 A1* | 7/2018 | Asai | G01S 17/86 |
| 2019/0236862 A1* | 8/2019 | Mercep | G08G 1/165 |
| 2019/0376640 A1* | 12/2019 | Innes | F16M 11/22 |
| 2019/0392610 A1* | 12/2019 | Cantadori | G01B 21/04 |
| 2020/0074767 A1* | 3/2020 | Cavalli | G07C 5/08 |
| 2020/0239010 A1* | 7/2020 | Corghi | G01S 7/4026 |
| 2021/0223034 A1* | 7/2021 | Stieff | G01S 7/4972 |
| 2021/0387637 A1* | 12/2021 | Rogers | H04W 4/48 |

* cited by examiner

SYSTEM AND METHOD FOR GYROSCOPIC PLACEMENT OF VEHICLE ADAS TARGETS

CROSS-REFERENCE TO RELATED APPLICATIONS

The present application is related to, and claims priority from, U.S. Provisional Patent Application Ser. No. 63/022,878 filed on May 11, 2020, which is herein incorporated by reference.

STATEMENT REGARDING FEDERALLY SPONSORED RESEARCH

Not Applicable.

BACKGROUND OF THE INVENTION

The present invention relates to general to a system and method for guiding the placement of vehicle Advanced Driver Assistance Sensor (ADAS) calibration targets or fixtures relative to a vehicle undergoing a service or inspection procedure, and in particular, to a system and method utilizing gyroscopic sensors to track relative movement and positioning of the calibration targets or service fixtures in a spaced relation to a vehicle disposed within a vehicle service environment.

Some vehicle service procedures require realignment or recalibration of various vehicle ADAS sensors, such as radar units or optical sensors. In order to carry out these procedures, specialized targets or service fixtures are precisely positioned in spaced proximity to the vehicle, often with the aid of a vehicle measurement system such as a wheel alignment or inspection system. Vehicle measurement systems can determine a vehicle position within the vehicle service area utilizing wheel-mounted targets observed by camera systems, or using positional measurement systems such as MEMS accelerometers or gyroscopes secured to the vehicle wheels as shown in IP.com publication IPCOM000200877D entitled "Gyroscopic Sensors". U.S. Pat. No. 7,382,913 B2 to Dorrance describes a method and apparatus for guiding placement of a service fixture relative to a vehicle, based on measurements of the vehicle acquired by a separate machine-vision vehicle wheel alignment measurement system. Alternatively, U.S. Pat. No. 8,244,024 B2 to Dorrance et al. describes methods for guiding placement of a service fixture within a vehicle service area relative to a vehicle using only measurements of the vehicle acquired by sensors associated with the service fixture itself. Other techniques for guiding placement of targets or service fixtures relative to a vehicle undergoing a realignment or recalibration of a vehicle safety system sensor utilize laser emitters and optical camera systems to direct an operator to a placement location within a vehicle service area, and to verify placement, such as shown in U.S. Pat. No. 10,634,488 B2 to Stieff et al.

Systems and methods which utilize cameras to view target spatial positions, placement locations for the targets or service fixtures, and/or which utilize optical projectors to project visible indicia onto surfaces to indicate placement locations for the targets or service fixtures, require an uninterrupted line of sight to the targets and/or placement locations. These lines of sight can be blocked by the presence of an operator, various objects in the vehicle service area, or the vehicle itself.

Accordingly, it would be advantageous to provide a system and method for guiding an operator to properly position targets or service fixtures relative to a vehicle within a vehicle service area during a vehicle ADAS service procedure, and which does not require an uninterrupted line of sight between an observing camera system or optical projector and the targets, service fixture, or an intended placement location.

BRIEF SUMMARY OF THE INVENTION

Briefly stated, in an embodiment of the present disclosure, a vehicle ADAS target or service fixture is configured with an Inertial Measurement Unit (IMU) consisting of a combination of accelerometers and gyroscopes capable of estimating a relative position within the spatial volume of the vehicle service area by tracking changes in acceleration and rotation of the vehicle ADAS target or service fixture. A controller monitors movement of the IMU relative to an established reference location, generating output utilized by a vehicle service system to guide a technician positioning the vehicle ADAS target or service fixture at a selected location within the vehicle service area.

In a further embodiment, a vehicle service system is configured with a target and service fixture storage unit, in which individual targets or service fixtures used for vehicle ADAS service procedures are stored at established base locations within a vehicle service area frame of reference. A processing system associated with the vehicle service system is configured with software instructions to identify, during a vehicle service procedure, one or more selected locations within the vehicle service area reference frame for placement of individual targets or service fixtures. An IMU associated with each individual target or service fixture continuously or cyclically estimates a position (and orientation) of the associated target or service fixture relative to the established base location upon removal of the target or service fixture from the storage unit. Data representative of the position (and orientation) is relayed via a communication link to the processing system. Software instructions executed in the processing system evaluate the position (and orientation) data, and utilize the evaluated data to generate output directing a technician to move the target or service fixture to a selected location within the vehicle service area reference frame.

In another embodiment, the processing system is further configured with software instructions to utilize the evaluated data to guide a technician to orient the target or service fixture to a selected spatial orientation following a placement at the selected location within the vehicle service area frame of reference.

In an additional embodiment, the processing system operatively controls a visual display device, such as a graphical user interface to present the technician with guidance, via the visual display device, directing the technician to move and/or orient the target or service fixture within the vehicle service area frame of reference in response to the evaluated data to progress towards the selected location and/or selected spatial orientation.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
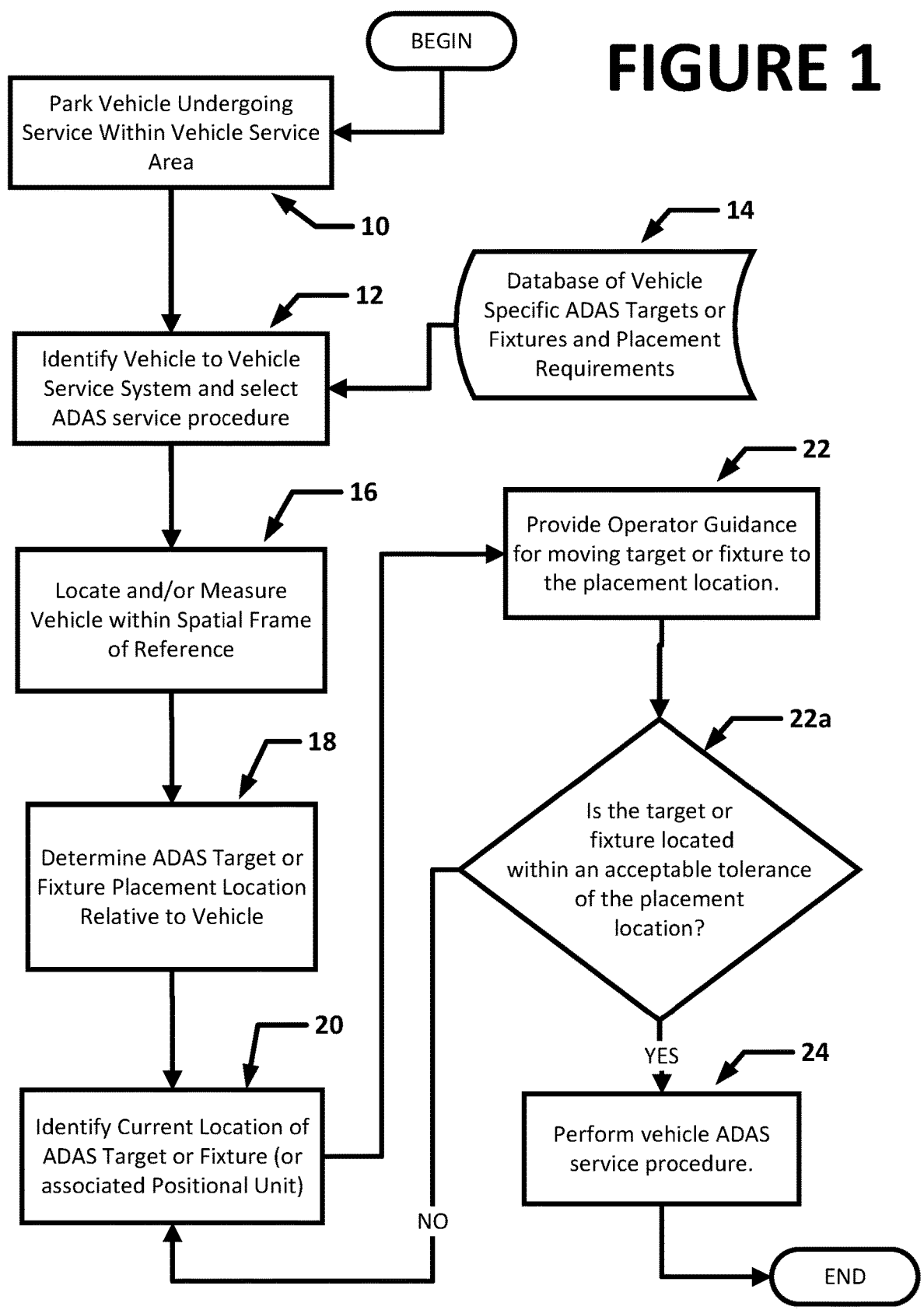
FIG. 1 is a flow chart illustrating an exemplary process of the present disclosure for guiding placement of a ADAS target or service fixture using positional data.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

A vehicle service system of the present disclosure consists of a vehicle measurement or inspection system 50, an operator console 52, one or more vehicle ADAS targets or service fixtures 54, and a processing system. The processing system is operatively configured to interact with, and to control, the components of the vehicle measurement or inspection system 50, including various user interface devices, and to communicate with remote services via a communications network (if present). The processing system is programmed to function in a conventional manner within a vehicle measurement or inspection system 50, utilizing sensors such as cameras 56 and optical range finders to acquire measurement data associated with the relative spatial position of a vehicle V undergoing service within a vehicle service area 104.

Turning to FIG. 1, during a vehicle service or inspection procedure, the vehicle V is positioned within the vehicle service area (Box 10), and is identified to the processing system (Box 12). Exemplary means for vehicle identification may include manual identification by an operator, automatic identification via license place OCR and record retrieval, or semi-automatic identification wherein basic vehicle identifying data is retrieved using a VIN lookup and the operator provides specific configuration details. Operating the vehicle measurement or inspection system, the processing system acquires conventional measurements of the vehicle, such as individual wheel alignment angles, a vehicle thrust line, a vehicle center line, etc., within a spatial frame of reference defined by the vehicle service system. For ADAS sensor service or inspection procedures, the vehicle identification is utilized by the processing system to recall identification of required ADAS targets or service fixtures and associated relative placement locations within the vehicle service area from an accessible database (Box 14). Alternatively, an operator can simply select or identify the ADAS targets or service fixtures if they are known in advance, as well as the associated relative placement locations. Using the acquired measurements, the processing system locates the vehicle V within a spatial frame of reference (Box 16), and determines the associated placement locations relative to the located vehicle (Box 18). For example, as is known in the industry, ADAS sensor service procedures for blind spot monitoring radar units require placement of radar-reflective targets at locations relative to the vehicle V which approximate the adjacent-lane blind spots. Surround-view camera systems may require the placement of optical target mats relative to the vehicle V on the floor surfaces of the vehicle service area 104. Other vehicle camera systems may similarly require placement of observable optical targets at various relative locations within a vehicle service area 104.

In an embodiment of the present disclosure, each ADAS target or service fixture 54 is associated, permanently or temporarily, with an Inertial Measurement Unit (IMU) 58 consisting of a combination of accelerometers and gyroscopes capable of locating a current relative position of the ADAS target or service fixture 54 within the spatial volume of the vehicle service area by tracking changes in acceleration and rotation which occur during movement. A controller coupled to the IMU 58 monitors movement of the IMU 58 relative to an established reference or base location, generating output which is conveyed over a communication link, such as a wireless link, to the processing system of the vehicle service system to identify the current location of the ADAS target or service fixture (Box 20). The processing system utilizes the identified current location to provide directional guidance (Box 22) in a feedback loop (Box 22a) to a technician to position the ADAS target or service fixture 54 at a selected location within the vehicle service area, after which the vehicle ADAS service or inspection is performed (Box 24). The IMU 58, controller, rechargeable battery, and accompanying electronic components are preferably contained within a positional unit secured to the ADAS target, service fixture, or a supporting framework thereof.

In some configurations, a dedicated positional unit is secured to each individual ADAS target or service fixture 54, while in an alternative configuration, a portable positional unit is provided for temporary placement on, or attachment to, the selected ADAS target or service fixture 54 at a known location. Exemplary placement or attachment locations on the ADAS target or service fixture 54 may include a visually indicated spot on a target floor mat, or a designated holder or receiving bracket located in a predetermined relationship to one or more axes of an upright ADAS target or service fixture 54. Providing a known location for placement or attachment of the positional unit establishes a relationship between the positional unit and the ADAS target or service fixture 54 during use.

Providing the IMU 58 and associated components in a self-contained positional unit for temporary association with the ADAS target or fixture 54 enables the operator to approximately place the ADAS target or service fixture 54 near the indented placement location without guided assistance, and to subsequently utilize the positional unit to aid in finalizing the placement to within a required level of accuracy. Use of a temporarily associated positional unit further enables the IMU 58 to be initialized to an established reference location, such as a battery charging station, without having to accommodate varying configurations and dimensions of different ADAS targets or service fixtures 54, allowing those elements to be stored in a separate location.

Vehicle ADAS targets or service fixtures 54 which incorporate an IMU 58 are stored or positioned in a location having a known or determinable location within the spatial reference frame of the vehicle service area. This may be in the form of a cabinet, locker, or other protective enclosure in which the ADAS targets or service fixtures 54 are kept when not in use or during battery recharging, or a starting point at which an initial spatial position and orientation for the IMU 58 is "zeroed". Following identification of a required ADAS target or service fixture 54 and an associated placement location 106 within the vehicle service area 104, the operator retrieves the required ADAS target or service fixture 54 from the storage location or an initial spatial position. Subsequent movement is monitored by the IMU 58 mounted to the ADAS target or service fixture 54 (or in a positional unit associated with the ADAS target or service fixture) and communicated to the processing system via the wireless communications link. In response to receipt of movement data from the IMU 58, the processing system provides the operator with guidance for movement towards the intended placement location 106.

Figure 2:
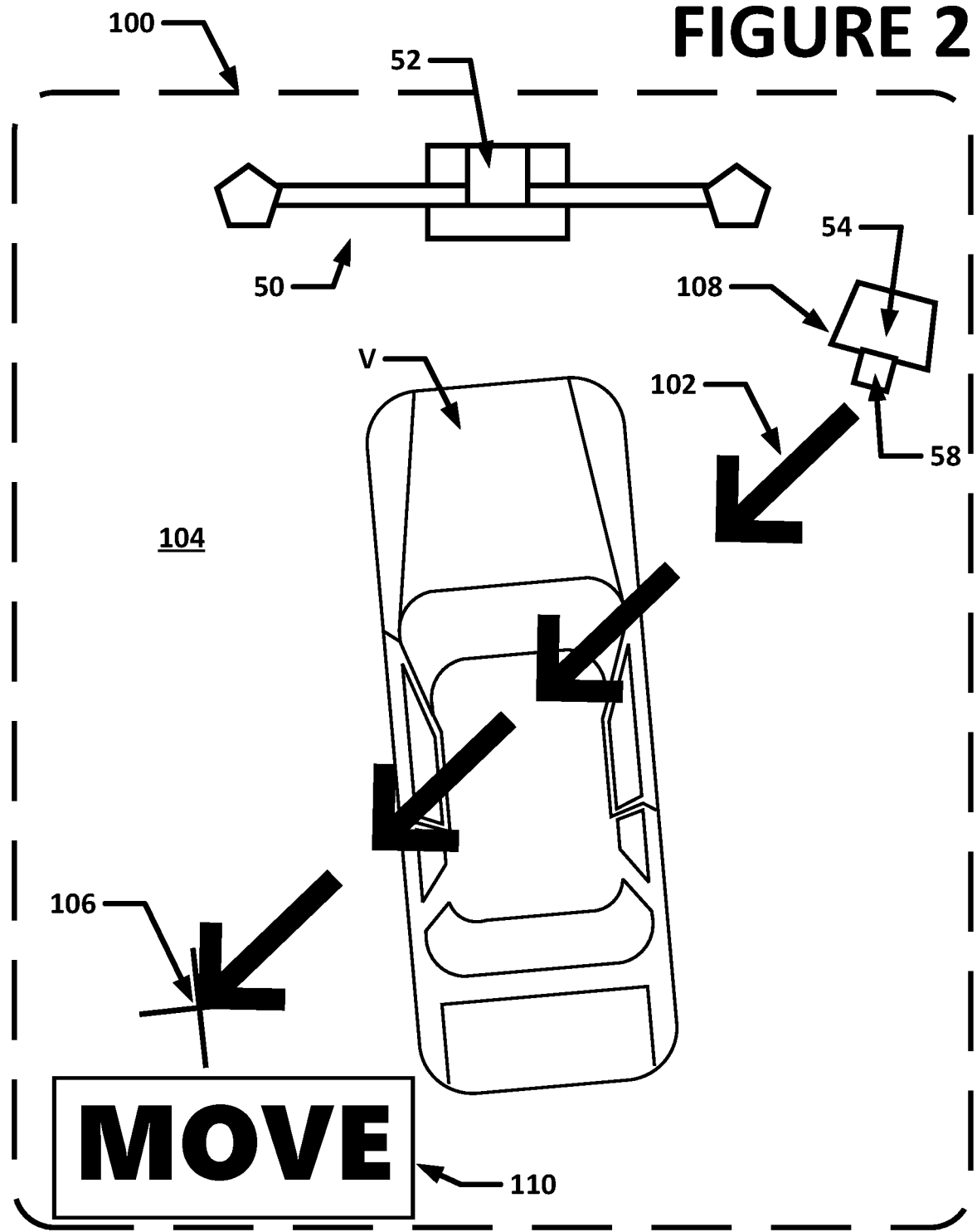
FIG. 2 is an exemplary illustration of visual guidance presented in a graphical user interface to an operator directing movement of an ADAS target or service fixture from an initial position to a selected placement location.
Figure 3:
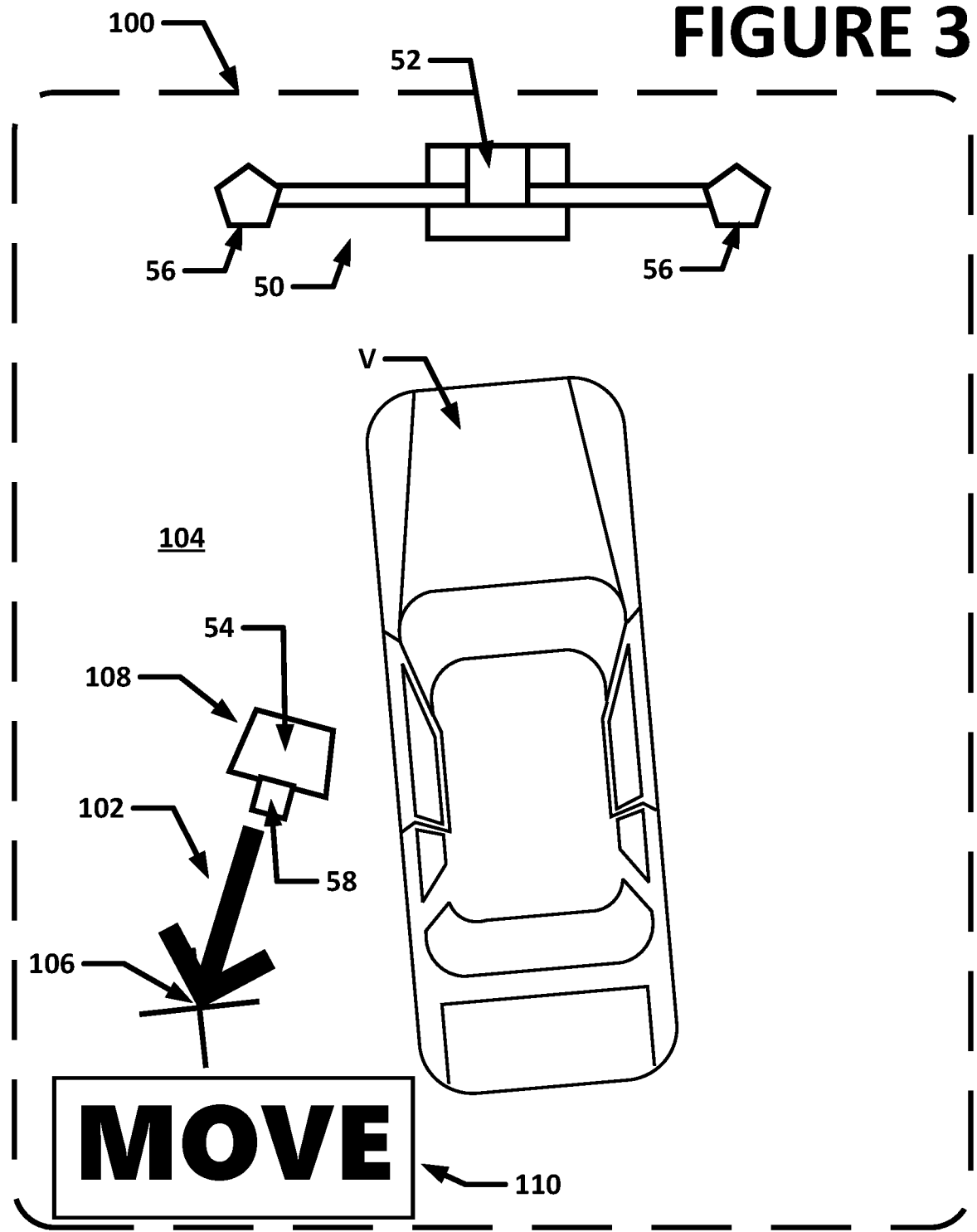
FIG. 3 is an exemplary illustration similar to FIG. 2, as may be presented to the operator during movement of the ADAS target or service fixture.
Figure 4:
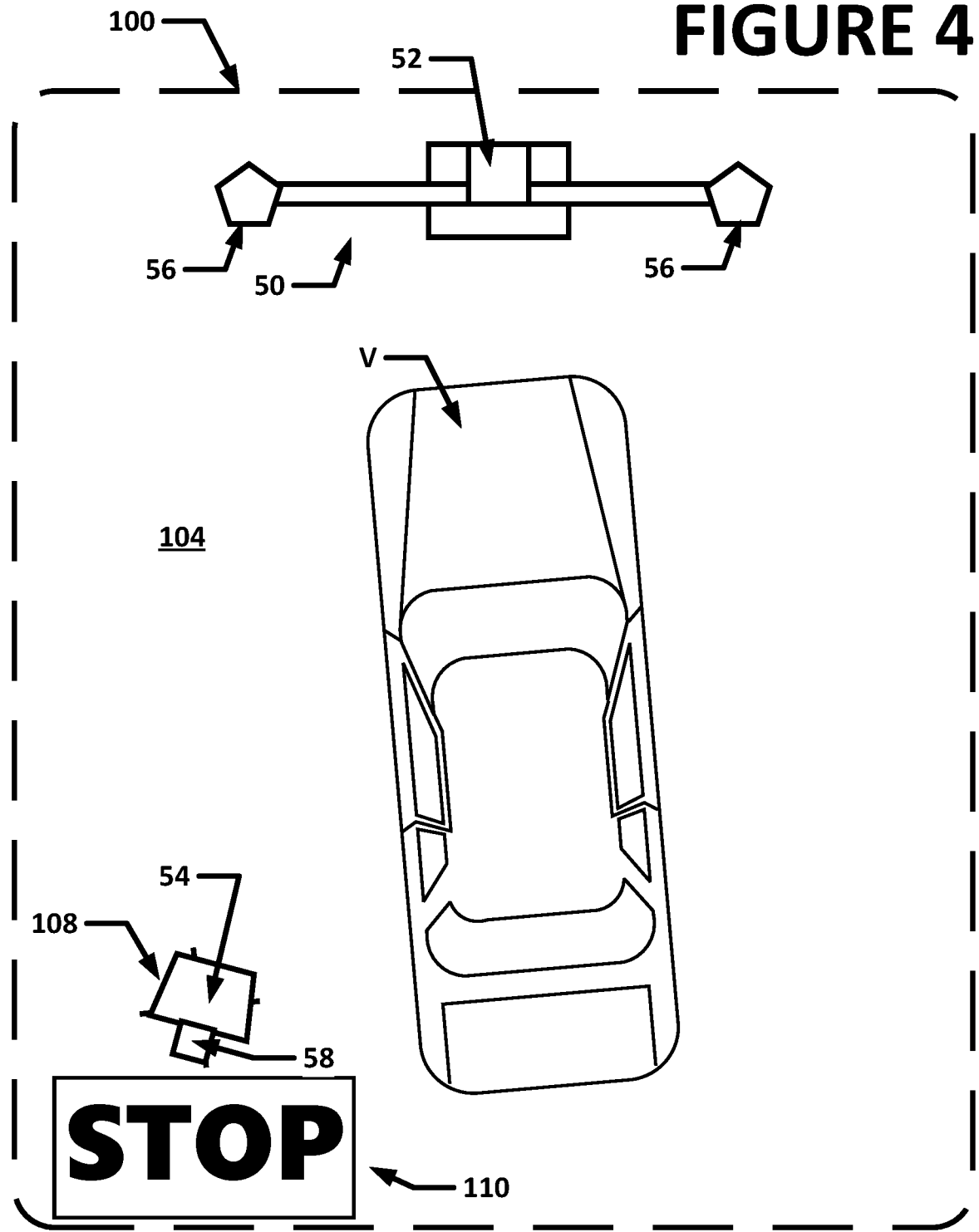
FIG. 4 is an exemplary illustration similar to FIGS. 2 and 3, as may be presented to the operator when the ADAS target or service fixture has been moved to within an acceptable tolerance of the selected placement location.

In one embodiment, the guidance is provided in the form of a visual indication on a display device 100, such as with directional arrows 102, or a plan view of the vehicle service area 104 in which both the intended placement location 106 and the current location 108 of the ADAS target or service fixture 54 are displayed, such as shown at FIG. 2. As the operator moves the ADAS target or service fixture 54 within the vehicle service area 104, the processing system utilized the communicated movement data to continuously update the visual display 100, providing a near real-time representation of the relation between the current position 108 of the ADAS target or service fixture 54 (as indicated by the IMU 58) and the intended placement location 106. By viewing the visual display 100 while moving the ADAS target or service fixture 54, the operator self-directs movement towards the intended placement location 106.

In addition to providing a visual representation of the positional relationship between the current position 108 of the ADAS target or service fixture 54 and the intended placement location 106, the processing system may be configured with software instructions to generate instructional guidance to the operator directing movement required to reach the intended placement location 106 from the current position 108 of the ADAS target or fixture 54. This generated guidance may take the form of a text message 110 on the visual display, an audible signal which varies with separation distance, spoken directions, or a visual indication of a required movement direction and/or separation distance.

In one embodiment, the display device on which the processing system is presenting the visual display 100 of guidance to the operator is a hand-held or portable device in communication with the processing system, such as a smartphone or tablet device, configured with an appropriate communications link and software application. By utilizing a hand-held or portable device to present the visual display 100, the operator is not required to maintain a line of sight to, or monitor the presentation on, a fixed display associated with the vehicle service system 50. In an alternative configuration the display device is mounted on the structure of the ADAS target or service fixture 54 itself, and is configured with an appropriate controller and components to receive communications from the processing system. With this alternative configuration, the movement data generated by the IMU 58 on the ADAS target or service fixture 54 may be communicated to the processing system through the onboard controller and communication components, which function to establish a bi-directional communications link with the processing system, such as through a wireless connection.

In an alternate configuration of the ADAS target or service fixture 54 including a controller and operatively coupled components to receive communications from the processing system, the processing system is configured with software instructions to communicate an identification of the intended placement location 106 to the controller instead of directing movement of the ADAS target or service fixture 54. The controller associated with the ADAS target or service fixture 54 receives the identified placement location 100, and utilizes movement information from the associated IMU 58 to generate guidance information for conveyance to an operator directly from an output provided on, or associated with, the ADAS target or service fixture 54 itself. The provided output may be in the form of an aforementioned visual display 100, a presentation on a handheld device, or an audible signal varying in strength or intensity based on the proximity of the ADAS target or service fixture 54 to the intended placement location 106.

As a method for guiding placement of a vehicle ADAS target or service fixture 54 within a vehicle service area, an embodiment of the present disclosure includes the steps of: (i) acquiring spatial measurements associated with a vehicle V disposed within a frame of reference encompassing said vehicle service area (Box 16); (ii) evaluating said acquired spatial measurements to identify at least one placement location 106 within said frame of reference relative to said vehicle (Box 18); (iii) selecting a movable ADAS target or service fixture 54 for placement at said identified placement location (Box 14); (iv) generating data representative of a current location 108 for the movable ADAS target or service fixture (Box 20) and spatial movement of a positional unit associated with said movable ADAS target or service fixture (Box 22a); (v) processing said generated data to track a displacement of said positional unit from said identified placement location 106; and (vi) providing, from said tracked displacement, operator guidance for placement of said positional unit at said identified placement location (Box 22). The provided operator guidance may be a visual display 100 providing a text message 110, at least an indication of a direction of required movement, or an audible signal varying in relation to said displacement of said positional unit from said identified placement location 106.

To facilitate identifying to an operator when the positional unit (and the associated vehicle ADAS target or service fixture 54) is positioned correctly within the vehicle service area 104, the operator guidance provided by either the positional unit or the processing system may include an indication that a displacement between the current location 108 of the positional unit and the identified placement location 106 is within an acceptable displacement threshold or tolerance. This may be a visual indication, such as a green light, a stop symbol, or an audible indication.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A vehicle service system comprising:
a set of sensors configured to acquire spatial measurements associated with a vehicle disposed within frame of reference;
at least one movable Advanced Driver Assistance Sensor (ADAS) target or service fixture for placement at an identified placement location relative to said vehicle within said frame of reference;
a processing system operatively coupled to said set of sensors, said processing system configured with software instructions to identify said placement location for said at least one movable ADAS target or service fixture within said frame of reference relative to said vehicle using said acquired spatial measurements;
a positional unit associated with said movable ADAS target or service fixture, said positional unit configured with an Inertial Measurement Unit (IMU) generating data representative of spatial movements relative to a reference location, a communications interface, and control logic adapted to convey said spatial movement data to said processing system via said communications interface; and
wherein said processing system is further configured with software instructions to track a movement of said movable ADAS target or service fixture relative to said identified placement location based on said conveyed spatial movement data, and to generate operator guidance directing movement of said ADAS target or service fixture required for placement at said identified placement location.

2. The vehicle measurement system of claim 1 further including a storage location for said movable ADAS target or service fixture, said storage location defining said reference location.

3. The vehicle measurement system of claim 1 wherein said positional unit is separable from said movable ADAS target or service fixture, and further including a base station for said positional unit, said base station defining said reference location.

4. The vehicle measurement system of claim 1 including a visual display device, and wherein said processing system is configured with software instructions to present said generated operator guidance on said visual display device.

5. The vehicle measurement system of claim 4 wherein said generated operator guidance includes an illustration of a spatial relationship between a current location of said positional unit within said frame of reference and said identified placement location.

6. The vehicle measurement system of claim 4 wherein said generated operator guidance includes a representation of at least a displacement direction and a displacement distance between a current location of said positional unit and said identified placement location within said frame of reference.

7. The vehicle measurement system of claim 4 wherein said visual display device is a portable display in operative communication with said processing system.

8. The vehicle measurement system of claim 7 wherein said portable display is incorporated into, and controlled by, one of a tablet device, a laptop PC, or a mobile phone.

9. The vehicle measurement system of claim 4 wherein said visual display is incorporated into, and controlled by, said positional unit.

10. The vehicle measurement system of claim 1 wherein said positional unit is further configured to convey an orientation about at least one axis to said processing system; and
wherein said processing system is further configured with software instructions to evaluate said conveyed orientation data to generate operator guidance to orient said ADAS target or service fixture about said at least one axis.

11. The vehicle measurement system of claim 1 wherein said at least one movable ADAS target or service fixture is a target mat configured for placement on a flat surface within said frame of reference, and wherein said target mat includes at least one visible indicia defining a placement location for said positional unit on said target mat.

12. The vehicle measurement system of claim 1 wherein said at least one movable ADAS target or service fixture includes a support stand, a target coupled to said support stand, and an attachment for securing said positional unit to either said target or said support stand.

13. A method for guiding placement of an Advanced Driver Assistance Sensor (ADAS) target or service fixture within a vehicle service area, comprising:
acquiring spatial measurements associated with a vehicle disposed within a frame of reference encompassing said vehicle service area;
identifying at least one placement location for said ADAS target or service fixture within said frame of reference relative to said vehicle from said acquired spatial measurements;
selecting said ADAS target or service fixture from a reference location for placement at said identified placement location;
generating data representative of spatial movement of a positional unit associated with said ADAS target or service fixture from said reference location;
processing said generated data to track a displacement of said positional unit from said identified placement location; and
providing, from said tracked displacement, operator guidance for placement of said positional unit and said associated ADAS target or service fixture at said identified placement location.

14. The method of claim 13 wherein said operator guidance is a visual display indicating at least a direction of required movement.

15. The method of claim 13 wherein said operator guidance is an audible signal varying in relation to said displacement of said positional unit from said identified placement location.

16. The method of claim 13 wherein said operator guidance includes a visual confirmation of said displacement of said positional unit from said identified placement location being at or below an acceptable displacement threshold.

17. A vehicle measurement system comprising:
- a set of sensors for acquiring spatial measurements associated with a vehicle disposed within frame of reference;
- at least one Advanced Driver Assistance Sensor (ADAS) target or service fixture for placement at an identified placement location;
- a processing system configured to identify said placement location within said frame of reference relative to said vehicle from said acquired spatial measurements;
- a positional unit for association with said ADAS target or service fixture, said positional unit configured with an Inertial Measurement Unit (IMU) generating data representative of spatial movement relative to a reference location, a communications interface, and control logic adapted to receive a representation of said identified placement location within said frame of reference from said processing system via said communications interface; and
- wherein said control logic is further configured with software instructions to evaluate said received representation and said generated data to track a displacement of said positional unit from said identified placement location, and to generate and convey guidance to an operator directing movement of said positional unit towards said identified placement location.

18. The vehicle measurement system of claim 17 wherein said positional unit includes a visual display, and wherein said control logic is configured with software instruction to convey said operator guidance on said visual display.

19. The vehicle measurement system of claim 17 wherein said generated operator guidance includes a representation of a spatial relationship between a current location of said positional unit within said frame of reference and said identified placement location.

20. The vehicle measurement system of claim 17 wherein said generated operator guidance includes an identification of at least a displacement direction and a displacement distance between a current location of said positional unit within said frame of reference and said identified placement location.

* * * * *